(12) United States Patent
Albuz et al.

(10) Patent No.: US 7,203,823 B2
(45) Date of Patent: Apr. 10, 2007

(54) PARTIAL AND START-OVER THREADS IN EMBEDDED REAL-TIME KERNEL

(75) Inventors: Elif Albuz, San Jose, CA (US); Gong-San Yu, Milpitas, CA (US); Leonid Abraham Milenky, Mountain View, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 629 days.

(21) Appl. No.: 10/339,954

(22) Filed: Jan. 9, 2003

(65) Prior Publication Data

US 2004/0139306 A1 Jul. 15, 2004

(51) Int. Cl.
*G06F 9/445* (2006.01)

(52) U.S. Cl. .............. 712/229; 712/43; 712/228

(58) Field of Classification Search ........... 712/228, 712/229, 43
See application file for complete search history.

(56) References Cited

U.S. PATENT DOCUMENTS

| | | | | |
|---|---|---|---|---|
| 5,613,114 | A | | 3/1997 | Anderson et al. ........... 395/678 |
| 5,729,748 | A | * | 3/1998 | Robbins et al. ............. 717/137 |
| 6,026,479 | A | * | 2/2000 | Fisher et al. ................. 712/24 |
| 6,065,114 | A | | 5/2000 | Zahir et al. ................. 712/228 |
| 6,205,543 | B1 | * | 3/2001 | Tremblay et al. ........... 712/228 |
| 2001/0010075 | A1 | | 7/2001 | Tremblay et al. ........... 712/228 |
| 2002/0161957 | A1 | * | 10/2002 | Comeau et al. ............. 710/260 |

OTHER PUBLICATIONS

Voelker, Georffrey M. "CSE 120 Principles of Operating Systems—Lecture 5: Threads", Fall 2000. ©Oct. 2, 2000. pp. 1-14. http://www.cse.ucsd.edu/classes/fa00/cse120/lectures/5-threads.pdf.*
Kahl, Wolfram. "Processes and Threads". ©2002. http://www.cas.mcmaster.ca/~kahl/SE3B04/2002/.*
www.dictionary.com ©2000 search term: process.*

(Continued)

*Primary Examiner*—Eddie Chan
*Assistant Examiner*—Aimee J Li
(74) *Attorney, Agent, or Firm*—John L. Rogitz (57) ABSTRACT

Methods and apparatus for implementing partial and start-over threads in a kernel of an operating system are disclosed. In a computing system having at least one CPU, registers for executing threads, and memory, a method for executing a partial thread includes executing a first thread in the registers, initiating an interrupt event that signals the activation of another thread, saving a first portion of registers to a memory location, wherein a second portion of the registers is unsaved, the first portion including information associated with the first thread, executing in the registers, the another thread, and conducting further computing system operations. Additionally, conducting further computing system operations can include restoring the saved first portion of registers from the memory location to the registers and resuming execution of the first thread. Also, another embodiment incorporates the foregoing method into a computer device.

17 Claims, 7 Drawing Sheets

OTHER PUBLICATIONS

Free On-Line Dictionary of Computing. FOLDOC. ©1995. www.foldoc.org Search Term: interrupt.*

Waldspurger et al.: "Register Relocation: Flexible Contexts for Multithreading" IEEE. Comp. Soc. Press, US, vol. Symp20, May 16, 1993, pp. 120-130.

Jung et al: "Flexible register window structure for multi-tasking" Conference Proceedings article, vol. 1, Jan. 8, 1991, pp. 110-116.

Ananymous: "Deterministic context Switching of Registers", IBM Technical Disclosure Bulletin, vol. 32, No. 6B, Nov. 1, 1989, pp. 70-73.

* cited by examiner

PARTIAL AND START-OVER THREADS IN EMBEDDED REAL-TIME KERNEL

I. FIELD OF INVENTION

The invention relates generally to methods and apparatus for context switching in a computing system. In particular, the invention relates to methods and apparatus for implementing partial and start-over threads in an embedded real time kernel.

II. BACKGROUND OF THE INVENTION

A kernel is the core of an operating system which provides basic services to other parts of the operating system. Typically, a kernel (or any comparable center of an operating system) includes an interrupt handler for handling requests or completed I/O operations that compete for the kernel's services, a scheduler that determines which processes (e.g., threads or programs) share the kernel's processing time, and in what order. The scheduler may also include a supervisor for giving use of the CPU to each process when it is scheduled. A kernel may also include a manager of the operating system's address spaces in memory or storage, sharing these among all components and other users of the kernel's services. A kernel's services are requested by other parts of the operating system or by application through a specified set of program interfaces sometimes known as system calls. A most basic of kernel processes is called a thread.

In general, a thread is a sequence of central processing unit (CPU) instructions or programming language statements that may be independently executed. Generally, a thread executes an operating system task. During the execution, a thread will execute a series of operations in a CPU. Generally, threads are executed using registers of an execution unit of the CPU. Although many threads can be operating at the same time, threads that require the use of the same CPU resources can not operate using the same system resources at the same time. Thus, in order to operate properly the threads are prioritized.

In particular, threads requiring access to the registers of the CPU execution unit can be prioritized to permit higher priority threads to be executed before lower priority threads. The process of determining which thread will be executed next is referred to as scheduling. In those systems having prioritized threads, scheduling of the prioritized threads is typically performed by an operating system service called a scheduler. The scheduler operates under the control of a scheduling algorithm. A typical scheduler includes a run queue into which each thread is placed. Each thread is assigned an integer priority (i.e., one that is bounded above and below by system constants) which is used to determine its priority in the queue.

Figure 1:
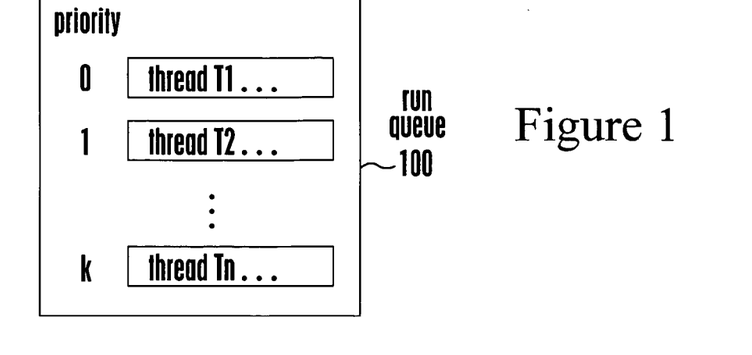
FIG. 1 figuratively illustrates a conventional run queue.

FIG. 1 illustrates an example of a conventional run queue 100 of a scheduler. The run queue 100 is an ordered queue of n threads (thread 0 through thread n) having k priority levels (0 through k). During operation, higher priority threads are executed before lower priority threads. This is facilitated by the scheduler. Also, during thread execution, certain threads can be activated and preempt the operation of lower priority threads. For example, during operation, a lower priority thread is preempted when a higher priority thread becomes active. The preempted thread (having a lower priority) ceases operation until the active higher priority threads have completed their operations. For example, if an executing thread T2 (having a priority of 1) is preempted by a thread T1 (having a priority of 0), then the thread T1 (having the highest priority of 0) is placed at the head of the queue in the scheduler and is executed while thread T2 waits in the queue until it becomes the highest priority thread.

In a most simplified example, a thread having the highest priority in the scheduler begins executing operations in accordance with its instructions, completes its operation, then ends. At that point a scheduler is accessed and the next highest priority thread is executed, and so on.

Figure 2A:
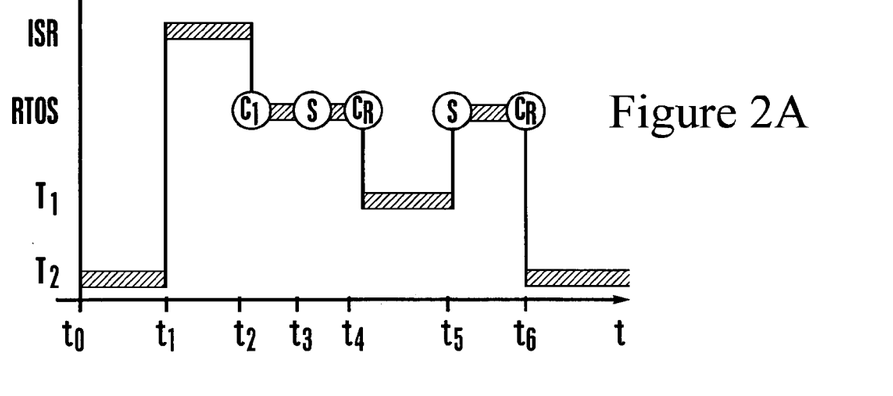
FIG. 2(a) graphically illustrates an example of multi-threaded event operation.

On the other hand, multiple threads may attempt to execute operations that involve the same CPU assets. Such a case is illustrated in FIGS. 2(a)–2(e). FIG. 2(a) is a timing diagram with the horizontal axis representing elapsed time t. Mapped on the vertical axis are threads T1 and T2, the operation of a real time operating system (RTOS), and the interrupt service routine (ISR).

Figure 2B:
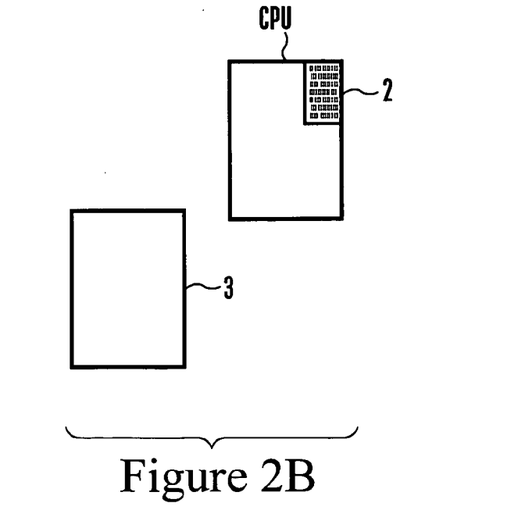
FIGS. 2(b)–2(e) are figurative depictions of conventional full thread operation.

At t0 a thread T2 is operating normally. FIG. 2(b) figuratively illustrates the operation of thread T2 in a computing device having a CPU 1. A portion of the CPU 1 is dedicated to the execution of threads (execution unit 2). Additionally, the CPU 1 and execution unit 2 operate in conjunction with memory 3. The execution unit 2 comprises a plurality of registers upon which the thread operates. In one example, the CPU execution unit 2 can comprise 32 registers of 32 bits each. Of course, other configurations are known and used by those having ordinary skill in the art. The inventors contemplate that the later discussed principles of the invention can be practiced in conjunction with any of the architectures.

Figure 2C:
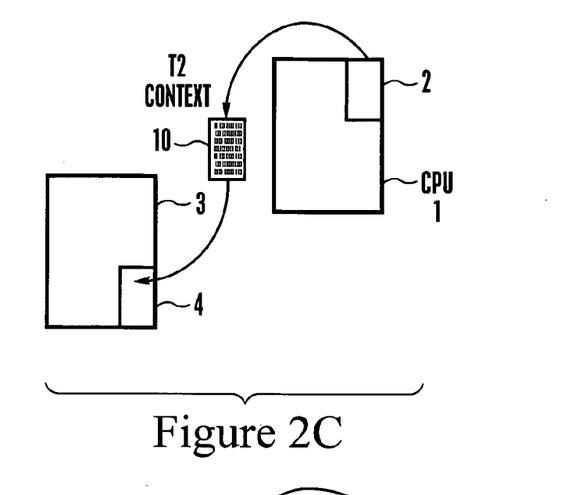

Referring back to the example of FIG. 2(a), at $t_1$ an ISR interrupts the ordinary operation of thread T2. In response, at $t_2$, a context save operation $C_s$ is performed. The content of each of the registers of the execution unit 2 is saved by the CPU to a dedicated memory location designated for storing thread T2. This process is referred to as context saving. The information contained in the registers of the execution unit 2 is referred to as the context. FIG. 2(c) figuratively illustrates an ordinary context saving operation. The current state (content) of all of the registers of the execution unit 2 (i.e., the entire T2 context 10) is saved from the execution unit 2 and stored to a dedicated location in memory associated with thread T2 (shown here by 4).

Referring again to FIG. 2(a), at time $t_3$ the scheduler S is consulted in order to determine which thread has the current highest priority. For example, if we refer to FIG. 1, thread T1 has the highest priority (here, 0). As a result, thread T1 is the next thread to be implemented. With continuing reference to FIG. 2(a), at time $t_4$ the context for thread T1 is restored $C_R$.

Figure 2D:
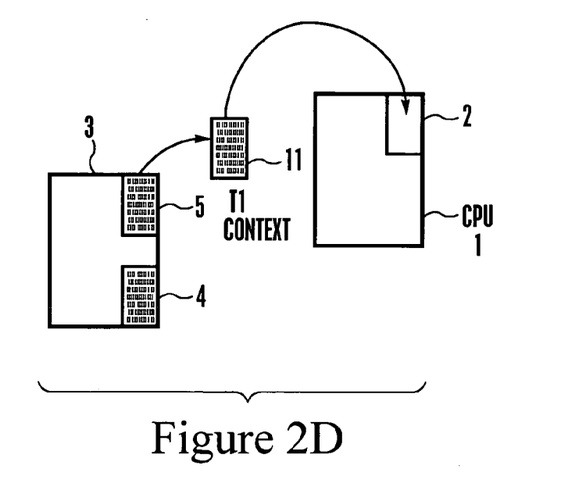
Figure 2E:
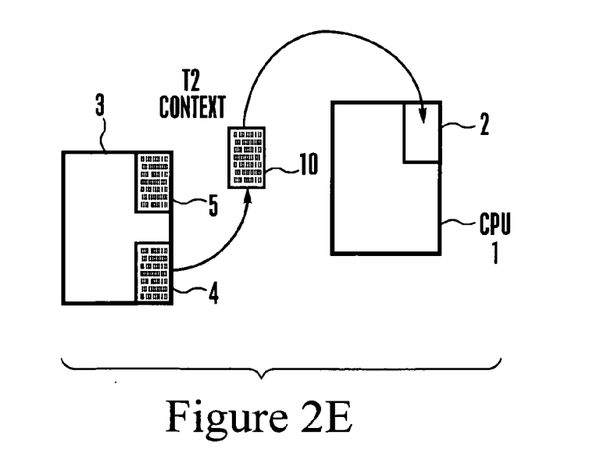

Referring now to FIG. 2(d), a figurative illustration of conventional context restoration is shown. A previously stored context for T1 is retrieved from its designated memory location 5. The T1 context 11 is then restored to the execution unit 2 of the CPU 1. At this point, thread T1 continues executing its instructions. With reference to FIG. 2(a), the thread T1 continues operation until it is completely executed. At time $t_5$, thread T1 completes operation. At this point, the scheduler is consulted. The next highest priority thread in the run queue 100 is then selected for execution. In the example depicted in FIG. 2(a), the next highest priority thread is thread T2. A context restore operation for thread T2 is then performed. The T2 context 10 is then retrieved from its dedicated memory location 4 and restored to the execution unit 2 of the CPU 1. At this point, the thread T2 begins operation at the point where it was interrupted at time $t_1$. Because thread T1 completed executing this operation, there is typically no need for the context of the T1 thread to be stored. However, in the future other T1 threads will be implemented and, if interrupted, the T1 context will be stored to the dedicated memory location 5.

Although this procedure is adequate for its intended purposes, it suffers from a number of drawbacks. First, it inefficiently manages CPU execution unit resources. For example, regardless of the size of the thread being executed in the CPU execution unit, the entire context is saved. Also, regardless of what portion of execution unit registers the thread has operated on, the entire context is saved. This means, for example, in an execution unit having 32 registers, if an active thread operates in registers 0–7, but has not yet operated on, for example, registers 8–31, all registers 0–31 are saved. This means that the whole context is saved even though registers 8–31 do not contain information relevant to the saved thread. These inefficiencies slow down the operation of the CPU, resulting in longer processing times for tasks operating in the CPU. Additionally, when a thread is preempted in mid process (e.g., when an ISR occurs), disruptions may occur in the operation of the interrupted thread such that the thread becomes disabled. An undesirable consequence of a disabled thread is the possibility of system failure. Therefore, there is a need for thread operations which increase processing speed without disrupting the operation of interrupted threads. This need for increased performance and response time is especially desirable in a RTOS of embedded systems.

In view of the foregoing, it should be apparent that improved mechanisms and frameworks for processing threads in a multi-threaded computer system would be desirable.

SUMMARY OF THE INVENTION

Accordingly, improved mechanisms for implementing threaded operations in a multi-threaded computer system are described.

In one aspect of the invention, in a computing system having at least one CPU, registers for executing threads, and memory, a method is disclosed for executing a partial thread. The method includes executing a first thread in the registers, and initiating an interrupt event that signals the activation of another thread. A first portion of registers (equivalently, register values) is saved to a memory location, and a second portion of the registers is unsaved. The first portion includes information that is associated with the first thread. Another thread may be executed in the registers to conduct further computing system operations. Additionally, conducting further computing system operations can include restoring the saved first portion of registers from the memory location to the registers and resuming execution of the first thread.

In one preferred embodiment, the first thread is a preemptive thread, and immediately after initiating an interrupt event, the first thread ceases operation. In another embodiment, the executing first thread is a non-preemptive thread such that after initiating an interrupt event, the first thread continues to execute in the registers until a thread termination event occurs. Preferably, partial threads and start-over threads are non-preemptive.

In another aspect, a method for executing a start-over thread in a computing system having at least one CPU, registers for executing threads, and memory, includes executing a first thread in the registers and initiating an interrupt event that signals the activation of a start-over thread. The start-over thread requires the use of a known quantity of registers during execution. A first portion of registers is saved to a memory location, with the first portion including information associated with the first thread. Only a number of registers equal to the known quantity of registers to be used by the start-over thread is saved, and a second portion of the registers is unsaved. The method further includes executing, in the registers, the start-over thread, and upon completion of the start-over thread, restoring from memory the first portion of registers.

In yet another aspect, in a computing system operating in a multi-threaded computing environment including at least one CPU, a plurality of registers in an execution unit, and memory, a method for operating a partial thread comprises executing a first thread in the registers of the execution unit, initiating an interrupt event, determining a next thread to be activated, determining the preemption status of the first thread, identifying the next thread as a partial thread, for the first thread, saving a first portion of the registers to a predesignated memory location associated with the first thread as a partial context, and not saving a second portion of the registers, executing, in the registers, the next thread; and conducting further computing system operations.

BRIEF DESCRIPTION OF THE DRAWINGS

The invention, together with further advantages thereof, may best be understood by reference to the following description taken in conjunction with the accompanying drawings in which.

In the above-referenced drawings like reference numerals designate like structural elements.

DETAILED DESCRIPTION OF THE DRAWINGS

In the following description, frameworks and methods for managing threads in an operating system environment are disclosed. A concept important to the understanding of the embodiments of the invention is that of a partial thread. A partial thread is a thread wherein during the context save operation only a portion of the registers (equivalently, the values of the registers) of the execution unit of the CPU are saved to memory. This portion of registers is saved to a predesignated memory location associated with the partial thread. This will be explained in greater detail in the following paragraphs. An additional concept is that of the "start-over" thread. A start-over thread is a very short thread which operates using only very few registers of the execution unit. As a result, when such threads are activated, only the registers which will actually be used by the start-over thread are stored in memory and after execution of the start-over thread the saved registers are restored to the execution unit. Additionally, because start-over threads require the storage of only a small number of registers, these registers can stored in any convenient memory location and do not require a specifically allocated memory location. Because the number of stored registers is so small they do not suffer from the same fragmentation difficulties that a larger context may undergo if it was stored in randomly available memory locations. These concepts will be illustrated in greater detail hereinbelow.

Another related concept is that of preemption. The description of FIGS. 2(a)–2(e) describes the operation of preemptive whole threads. The operation of a preemptive thread can be interrupted by an event that signals the activation of another thread. In particular, an interrupt event can be initiated when a higher priority thread is made ready and activated. Examples of such events include interrupt service routine calls wherein the highest priority thread in the scheduler is made ready and begins operation as soon as available. Also, an interrupt event can occur when certain preexisting conditions are satisfied for a thread which has previously been made ready. For example, if a thread has been made ready, but is stopped from execution in the registers by an operating system block (e.g., a semaphore) when the block becomes unlocked the resources (here, registers) become available for the operation of the thread which had been previously blocked. Another example is illustrated by a thread that has been made ready and is waiting for a message in order to become active and then the message is received activating the thread. Other system events known to those of ordinary skill in the art also cause interruptions in threads. In preemptive threads, thread execution is interrupted as soon as the preempting thread is made ready for operation. Another type of thread that is used in some embodiments of the present invention is a non-preemptive thread. Non-preemptive threads do not respond in the same way when they are notified of an interrupt event. Non-preemptive threads continue executing their tasks until they undergo a thread termination event. One example of such a thread termination event is the completion of the thread, at which point the scheduler is consulted and the next highest priority tasks are initiated. Other thread termination events are discussed hereinbelow.

As discussed previously, a premature interruption of thread processes may lead to the disruption and the destabilization of a thread. However, threads may be constructed in such a way that interruptions at certain points in their sequence of operations do not cause disruptions in their operation. As a result certain non-preemptive threads may be interrupted before they are completed under certain specified circumstances.

Because of the differing modes of operation, preemptive and non-preemptive threads must be identifiable. In one embodiment a preemption flag can be used by a thread to identify thread preemption status. When the preemption flag is enabled a thread can be immediately preempted and other active thread processes can be executed. When the preemption flag is disabled (identifying the thread as non-preemptive) a thread is not preempted by an interrupt event until a thread termination event occurs. As discussed briefly above, one type of termination event is a "thread exit" i.e., the thread continues operation until it is completed ("exits"). However, under certain circumstances non-preemptive threads can cease operation prior to completion. In another embodiment, a termination event comprises a "reschedule" command (or call) that is inserted into the code of the thread. A reschedule call operates as follows. When a non-preemptive thread is interrupted by an event, it does not automatically cease operation but continues operating until the reschedule call is executed, at which point another thread begins operation. In one embodiment, the reschedule call is executed, then the scheduler is consulted and the next highest priority ready thread begins operation. Additionally, the reschedule call itself can include a command which selects a specific thread for execution as the another thread. In a related embodiment, the reschedule call can include an instruction to alter the priority of the threads in the scheduler. Thereby, selecting the next thread to be executed. It can be seen that non-preemptive threads do not cease operation immediately upon the occurrence of an interrupting event but rather wait until they have completed their operation or a reschedule call is executed.

Figure 3:
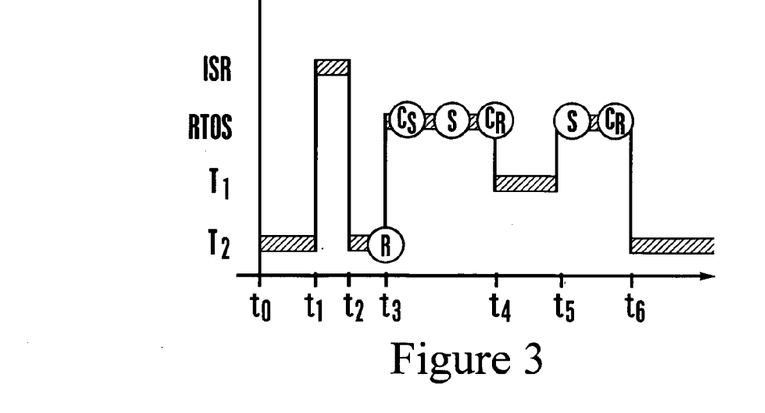
FIG. 3 graphically illustrates an example of multi-threaded event operation in accordance with the principles of the present invention.
Figure 4A:
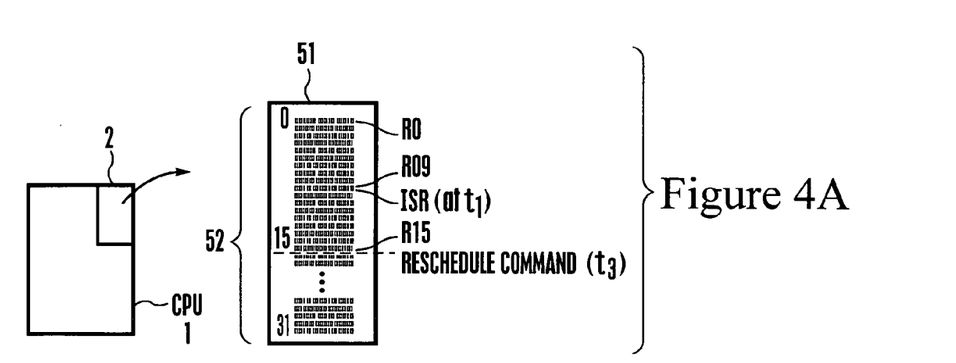
FIG. 4(a) is a diagram figuratively illustrating a portion of a computing device showing partial thread operation in an execution unit of a CPU in accordance with an embodiment of the invention.
Figure 4B:
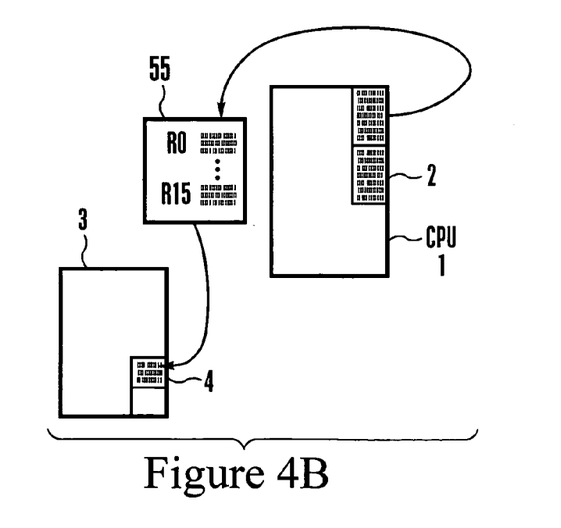
FIGS. 4(b) and 4(c) are diagrams that figuratively illustrate CPU and memory activity in a computing device during partial context saving of a non-preemptive thread in accordance with an embodiment of the invention.

FIG. 3 depicts a timing diagram in accordance with one embodiment of the present invention. Thread T2 is a non-preemptive partial thread. At $t_0$, a thread T2 is operating normally. Such operation is essentially the same as thread operation explained under FIG. 2(b). At $t_1$, an event interrupts the ordinary operation of thread T2. Here, the event is an ISR. As thread T2 has been defined as a non-preemptive thread, this means that during operation the thread T2 is not necessarily immediately interrupted and is programmed to complete its task or to continue operation until a reschedule command is activated. Referring to FIG. 4(a), a computing device having a CPU 1 of, e.g., an embedded system is depicted with the thread T2 operating in the execution unit 2. For ease of understanding, the thread T2 (here, 51), is shown in expanded schematic view such that the plurality of registers 52 of the execution unit 2 are depicted. The depicted embodiment has registers 0 through 31 (for a total of 32 registers), which will also be referred to as registers R0–R31. When activated, the thread T2 begins operating in register R0 and continues operating in accordance with the instructions of the thread. If, as depicted in FIG. 3, an ISR event occurs at $t_1$, the thread T2 51 is alerted to the ISR. In the depicted example, the ISR event occurs while the execution unit is operating in, for example, register R09. However, because the thread T2 51 has been designated a non-preemptive thread it is not immediately interrupted. This is illustrated with reference to FIG. 3. Thread T2 continues to operate from time $t_2$ until time $t_3$. During time $t_2$ to $t_3$, the thread T2 continues operation until, in this example, a reschedule R command is executed by thread T2. This is depicted at time $t_3$. FIG. 4(a) depicts this occurring in register R15 of the execution unit 2. At time $t_3$, the RTOS institutes a context save $C_S$ operation. However, unlike the context save operation depicted in FIGS. 2(a) through 2(e), not all of the registers of the execution unit are saved to memory. Only a first portion of the contents of the registers of the execution unit 2 are saved. The portion of the registers that are saved are referred to as a partial context. The partial context includes those registers that have had their contents modified by the operating thread (here, T2). The partial context can include the registers from thread execution start (typically, R0) to the reschedule call. Alternatively, the partial context can be a predesignated number of registers. In one embodiment, this predesignated number of registers can be half of the registers of the execution unit. In the depicted embodiment, only the registers (R0–R15) have been operated on by the thread T2. Thus, a partial context of thread T2 which includes information from registers R0–R15 is saved to memory 3. Even if a non-preemptive partial thread uses registers R16–R31 during execution as temporary registers, as might be done, at reschedule time only the contents of registers R0–R15 will be important and thus must be saved.

Figure 5:
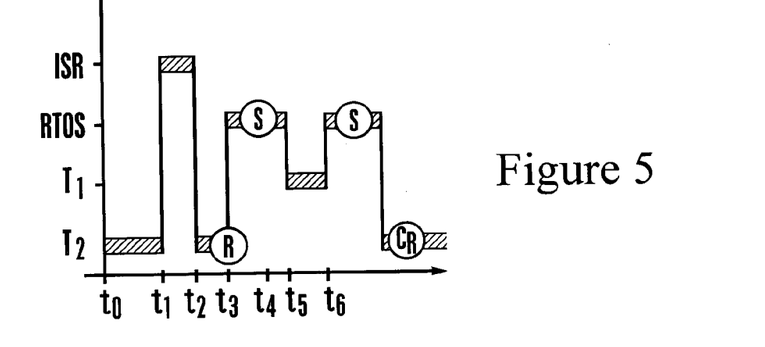
FIG. 5 is a timing diagram illustrating "start-over" thread operation in accordance with an embodiment of the invention.

This is figuratively illustrated in FIG. 5(b) where the partial context 55 is saved to a memory location associated with thread T2 (shown here as the dedicated memory location allocated for T2 contexts 4). However, as can be seen in the illustration, only half of the memory space as would be required for a whole context is required. Advantageously, the process of partial context saving only takes half of the amount of time which would be used had the whole context of T2 been saved. So, although the response time of the non-preemptive thread is slightly reduced because it does not immediately respond to the interruptive events, the overall system speed is increased because the time spent saving the partial thread to memory is substantially reduced. It is important to remember that another portion of registers, the unused registers (e.g., R16–R31) are not context saved because they have not been operated on by the thread and therefore contain no valuable information. Or, alternatively, the unsaved portion of registers is not saved because it is not included in the predetermined number of registers of the partial context.

Figure 4C:
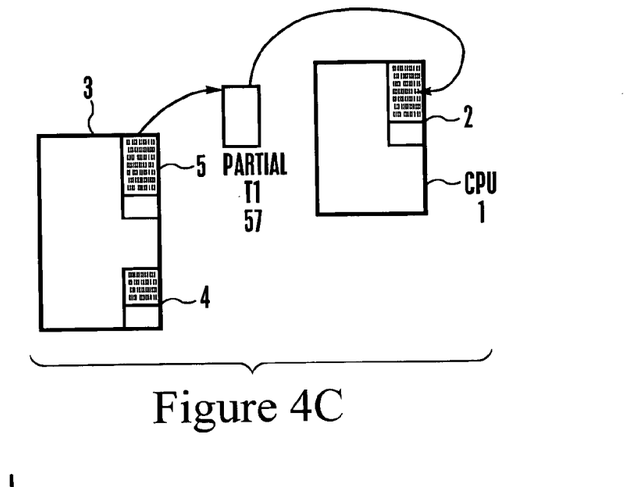

An additional advantage of some embodiments of the invention is reaped when previously saved contexts are restored into the execution unit 2 of the CPU 1. Where such previously saved contexts are also partial contexts, additional time is saved by not having to restore unnecessary registers. With reference to FIG. 3, at $t_4$ a context restore $C_R$ is performed on the thread identified by the scheduler as the thread having the highest priority. This concept is illustrated in FIG. 4(c). FIG. 4(c) depicts a partial context restore wherein the partial register block of thread T1 57 is retrieved from a memory location 5 and returned to the execution unit 2 of the CPU 1. Wherein, the thread can continue operation where it left off. Of course, the thread T1 can also be an entirely new thread with no saved context.

Returning to FIG. 3, once restored thread T1 operates from time $t_4$ to time $t_5$. In the depicted embodiment, thread T1 operates until its task is completed. At time $t_5$, the scheduler S is again consulted to determine next thread ready for execution. In the depicted embodiment, that thread has been identified as thread T2. In response, a context restore $C_R$ is performed on the partial memory block of thread T2 stored in memory 3 at memory location 4. This partial set of registers is returned to the execution unit 2 of the CPU 1 wherein thread T2 resumes operation shown here at $t_6$).

Another type of thread disclosed herein is a so-called "start-over" thread. A "start-over" thread is a very short thread, preferably operating using perhaps only one to four registers of an execution unit in the CPU. "Start-over" threads are generally reserved for tasks that occur frequently and are extremely short in duration. "Start-over" threads are preferably, non-preemptive threads. This means that the "start-over" thread is implemented, performs its extremely short task, and ceases operation. A comparison of "start-over" thread operation with that of partial thread operation is set forth in the timing diagram of FIG. 5. At $t_0$, a partial thread $T_2$ is operating normally. At $t_1$, an interrupt event signaling the activation of another thread occurs. This event is shown here as an ISR that interrupts the operation of partial thread $T_2$. Because partial thread $T_2$ is a non-preemptive thread, it is not immediately terminated and the context is not immediately saved. The thread continues until the thread T2 completes its task or, alternatively, until a reschedule call is executed during the operation of thread T2. In the depicted example, partial thread T2 executes a reschedule call R at $t_3$. At this point, the real time operating system (RTOS) consults the scheduler S, e.g., at time $t_4$. In the depicted embodiment, the scheduler identifies thread $T_1$ as a "start-over" thread and also as the thread having the highest priority in the priority queue. Consequently, operation of the "start-over" thread is initiated.

Figure 6:
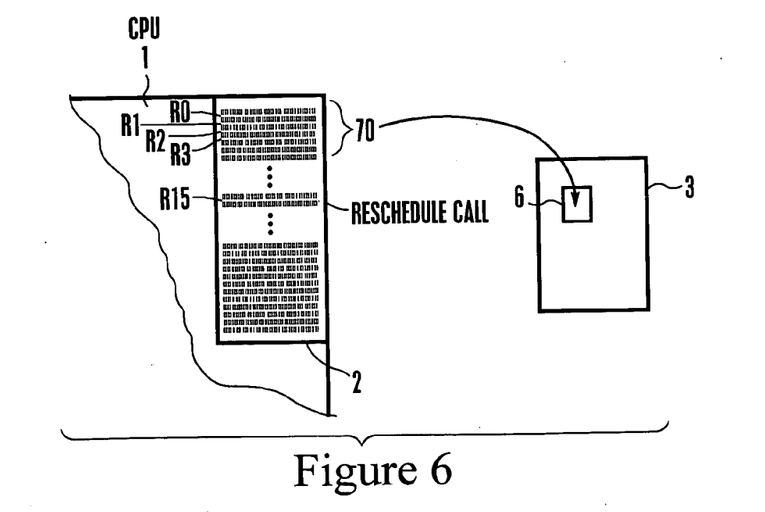
FIG. 6 is a diagram figuratively illustrating a start-over thread abbreviated context saving process in a computing device having a CPU and memory in accordance with an embodiment of the invention.

Operation of a "start-over" thread (here, T1) is slightly different from the operation of full and partial threads. Because the "start-over" thread, by definition, is so short, a different "context save" operation is utilized. First, the fact that thread T1 is a "start-over" thread is identified by the RTOS and, as a result, registers in the execution unit of the CPU are managed slightly differently. This begins as the RTOS identifies thread T1 as a "start-over" thread. Because "start-over" threads utilize so few registers of the execution unit of the CPU, certain efficient memory processes can be implemented to further reduce processing time and reduce the amount of memory system overhead required. After identification as a "start-over" thread, the number of registers which will be required for use by the "start-over" thread are identified. Typically, this could be information stored in a tag at the beginning of the "start-over" thread. As with other threads, space in the execution unit of the CPU is required to execute the instructions of the "start-over" thread T1. In conventional implementations, all of the registers of the execution unit would be saved in a context save operation to the memory. In the previously discussed partial thread embodiments, partial contexts are saved to dedicated memory locations associated with the saved threads where they can later be recalled. In a start-over thread, only the registers which will be required for the execution of the "start-over" thread are saved. For convenience, this portion of the registers is referred to as the abbreviated context. An embodiment illustrating this concept will be will be discussed with reference to FIGS. 5 and 6. FIG. 6 figuratively illustrates a portion of the CPU 1, including the execution unit 2, which is currently executing a thread. Here, that thread is a non-preemptive partial thread T2. As indicated previously, thread T2 continues operating until a reschedule call is executed at $t_3$. Referring again to FIG. 5, the reschedule call R is executed at time $t_3$ and is shown as occurring in register R15 (of FIG. 6). At this point, the scheduler identifies the "start-over" thread T1 as the next thread to be initiated. As shown in FIG. 6, four registers (R0, R1, R2, R3) are identified as being required for the operation of the "start-over" thread T1. Rather than saving the entire context or even half of the context (R0–R15) of T2, the "start-over" thread T1 initiates an "abbreviated context save". This means that rather than saving all of the registers operated upon by the partial thread T2 (here, that would be registers R0–R15) or saving the entire context, only the start-over portion (the portion of the registers 70 which will be utilized by the "start-over" thread) is saved. Because the number of registers to be saved is so small, no dedicated storage location is required in the memory. Instead, the RTOS merely locates the first available memory address having space capable of storing the registers 70. This usage of non-dedicated memory location 6 speeds up processing time and reduces the memory overhead of the system. Once the start-over portion is stored to the non-dedicated memory location 6, the "start-over" thread T1 can begin operation at time $t_5$. The "start-over" thread T1, operating in non-preemptive mode, operates until its task is completed (also known as a "thread exit") at $t_6$. At this point, the scheduler S is consulted again and the highest priority thread (here, T2) is made ready for continued execution wherein the abbreviated context information, which was stored at location 6, is returned to the execution unit 2 of the CPU 1. After restoration of the context of thread T2 by the restoration of registers 70, the thread T2 continues operation from register R15 until completed or possibly being interrupted again. It is to be noted that although start-over preferably operate as non-preemptive threads, they can operate as preemptive threads.

Figure 7:
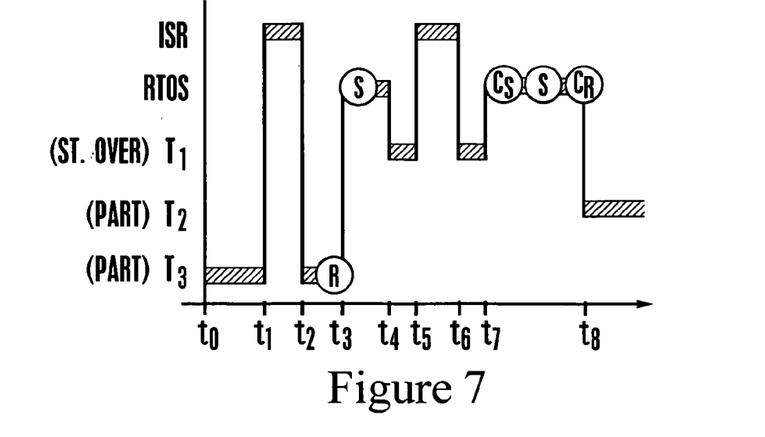
FIG. 7 is a timing diagram illustrating a multi-threaded mixed mode operation in accordance with an embodiment of the invention.

A powerful aspect of one embodiment of the present invention is the ability to operate in so-called mixed thread mode, wherein threads of many different types (full, partial, start-over) can all operate in the same embedded RTOS. FIG. 7 graphically illustrates a timing diagram wherein a system is operating in mixed thread mode. The depicted embodiment includes, for example, a "start-over" thread T1 and two partial threads, T2 and T3. At $t_0$, partial thread T3 is operating normally. An ISR is received at time $t_1$. Because partial thread T3 is a non-preemptive thread, thread T3 will not be interrupted until it completes its task or a reschedule call is executed. In the depicted embodiment, a reschedule call R occurs in the execution sequence of thread T3 at time $t_3$. Consequently, the scheduler is accessed. The next thread is then selected and executed. In the depicted embodiment, the run queue of the scheduler indicates that a "start-over" thread T1 has highest current priority. Consequently, the start-over thread T1 is executed. The RTOS identifies the "start-over" thread T1 as a start-over thread. As is the case with all "start-over" threads, an abbreviated context save is conducted for those registers which will be utilized by the "start-over" thread T1 during the execution of its process. "Start-over" thread T1 begins execution at time $t_4$. At time $t_5$, yet another ISR is received. However, because "start-over" threads are preferably non-preemptive threads, the "start-over" thread T1 continues operation until the thread exits (completes execution of its task) at time $t_6$. At this point, the RTOS restores the registers which were saved by the abbreviated context save required by "start-over" thread T1 and then conducts a context save of partial thread T3. The scheduler again determines the next thread. In the depicted embodiment the scheduler determines that thread T2 now has a higher priority than thread T3. As a result, a previously saved context for thread T3 is restored to the execution unit of the CPU. At this point (time $t_8$), partial thread T2 begins executing.

It should be noted that the threads can alter the priority queue of the scheduler. For example, thread T3 can be operating and can execute an instruction which tells the scheduler to change the priority of another thread. In particular, this finds usage when one thread wishes to call another thread during execution. Continuing the example, during execution thread T3 executes an instruction to call thread T2. As part of that instruction, the priority of thread T2 is altered to make it the highest priority thread. Consequently, when a reschedule call is executed by thread T3 the highest priority thread (here, T2) is made ready and executed.

Such partial and start-over threads can be implemented in general purpose computer systems. However, the improved performance and response time possible with Such threads makes them well suited for use in computing devices incorporated in embedded real time operating systems. Examples of such systems are myriad, including without limitation microprocessor controlled devices ranging from high performance avionics to anti-lock braking systems.

Figure 8:
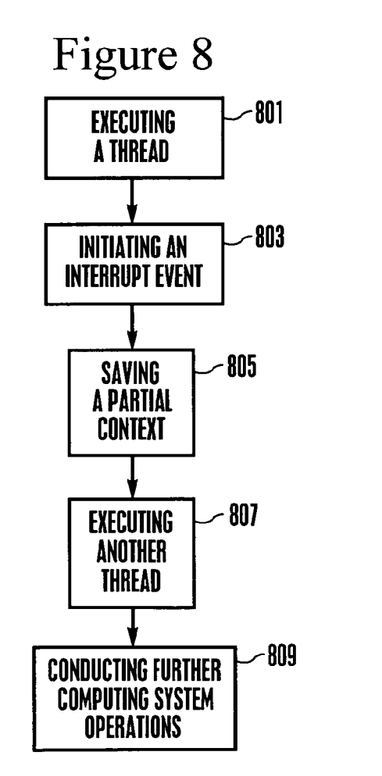
FIG. 8 is a flow diagram detailing one method embodiment in accordance with the principles of the present invention.

FIG. 8 is a flow diagram illustrating one method embodiment in accordance with the principles of the present invention. A first thread is executing instructions in the registers of an execution unit (Step 801). An interrupt event is initiated signaling the activation of another thread (Step 803). In one example, a semaphore is unlocked and the ready thread blocked by the semaphore now becomes active. A partial context saving of the executing first thread is conducted (Step 805). Another thread begins execution (Step 807). The another thread, for example being the highest priority ready thread as determined by a scheduler. Further computing system operations are then conducted (Step 809). These further operations can include restoring the partial context of the first thread from memory to execution unit wherein execution of the first thread can resume.

Figure 9:
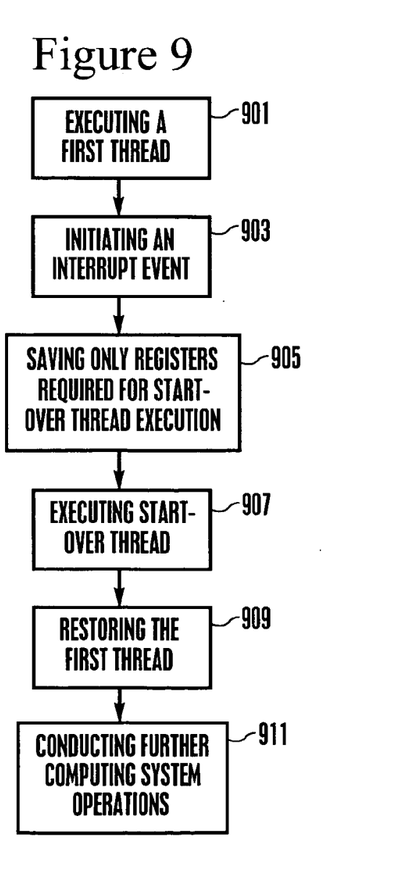
FIG. 9 is a flow diagram illustrating one method of executing a start-over thread embodiment in accordance with the principles of the present invention.

FIG. 9 is a flow diagram illustrating one method of executing a start-over thread embodiment in accordance with the principles of the present invention. In a computing device having at least one CPU, registers for executing threads, and memory, the method flows as follows. A first thread is executing in the registers (Step 901). An interrupt event that signals the activation of a start-over thread is initiated (Step 903). Typically, the event identifies the start-over thread as requiring the use of a known quantity of registers during execution. An abbreviated context saving of a first portion of registers to a memory location is conducted (Step 905). The saved first portion includes only the number of registers equal to the known quantity of registers to be used by the start-over thread during its execution. Upon completion of the start-over thread the first portion of registers is restored from memory to the registers (Step 909) and further computing system operations can be conducted (Step 911).

Figure 10:
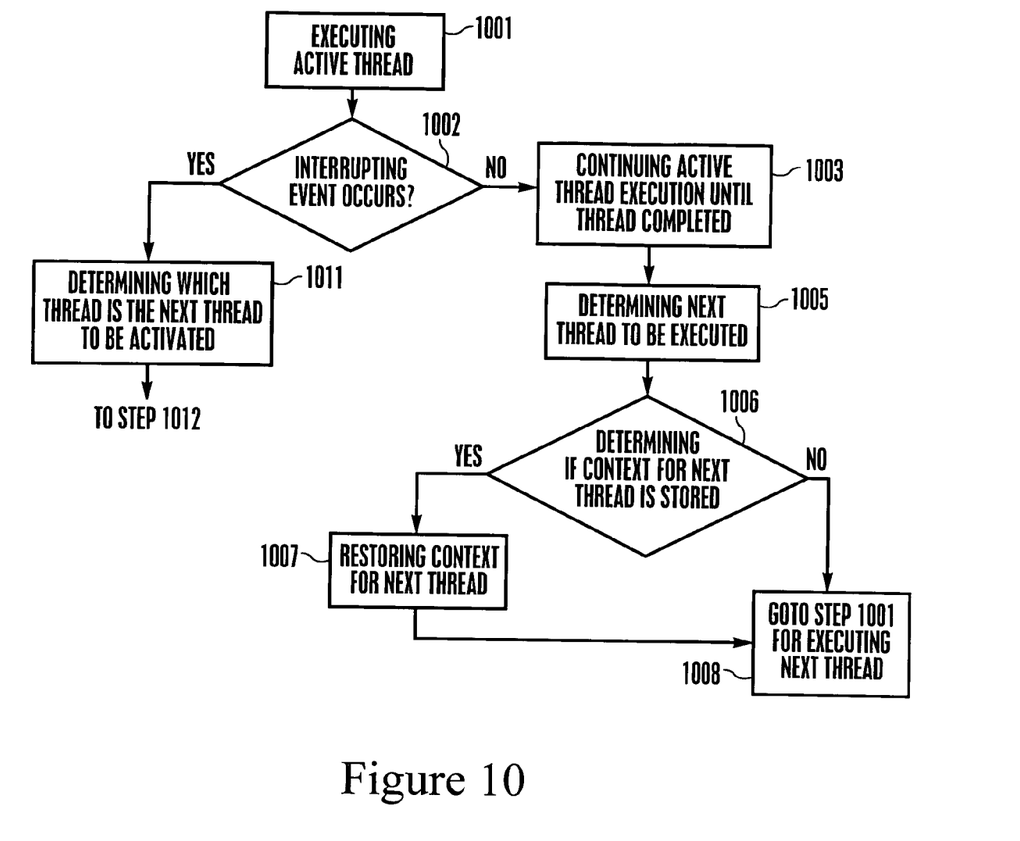
FIG. 10 is a flow diagram illustrating an embodiment for executing partial and start-over threads in accordance with the principles of the present invention.

FIG. 10 is a flow diagram illustrating a method embodiment for executing a partial and start-over threads in an operating system in accordance with the principles of the present invention. In a computing device having a central processing unit, which includes an execution unit having a plurality of registers, and a memory, a method embodiment for executing partial and start-over threads is described. During system operations, an active thread is executing instructions in the execution unit of the CPU (Step 1001). If no interrupting event occurs (at Step 1002), the active thread continues execution until the thread completely executes its instructions (Step 1003). The next thread to be executed is then determined (Step 1005). In a preferred embodiment, this is achieved by consulting a scheduler which determines which threads are ready for execution and which threads have the highest priority. The highest priority ready thread is typically the next thread to be executed. Prior to execution of the next thread, a determination is made as to whether a context for the next thread is stored in memory (Step 1006). If no context is stored in memory for the next thread, then the next thread begins execution (Step 1008) in much the same way as in Step 1001. However, if a context for the next thread is stored in memory, the context is restored to the registers of the execution unit (Step 1007). Once restored, the next thread begins executing (as in Step 1008).

However, if an interrupt event occurs during the execution of an active thread (Step 1002), then a different process flow occurs. Once the interrupting event is initiated, a determination is made as to which thread will be the next to be activated (Step 1011). In a preferred embodiment, this determination is made by a scheduler which identifies the threads which are ready for execution and identifies the priority of such threads. Typically, the highest priority ready thread is selected as the next thread. Also, the preemption status of the currently executing thread must be determined (Step 1012). As previously discussed, the threads can be preemptive or non-preemptive. In the case of a preemptive thread, the next thread immediately preempts the operation of the executing thread. A determination of thread type is made for the next thread (Step 1013). If the next thread is identified as a partial thread, a partial context saving is conducted (Step 1021). Typically, a partial context saving includes saving a first portion of the registers of the execution unit and leaving a second portion of the registers of the execution unit unsaved. Once the partial context has been saved, the next thread begins executing instructions in the registers of the execution unit (Step 1022). This thread execution is the same as for Step 1001.

If the next thread is determined to be a start-over thread (Step 1013), then an alternative process follows. An abbreviated context saving step is performed (Step 1015). The abbreviated context saving includes saving only those registers which are to be used by the start-over thread during its execution. The start-over thread is then executed in the registers of the execution unit (Step 1016). Upon completion of the start-over thread (Step 1017), the information stored in the abbreviated context saving operation of Step 1015 is restored to the registers of the execution unit (Step 1018). Upon restoration of the context to the execution unit, the previously preempted thread resumes operation as an executing active thread (Step 1019) and proceeds in much the same manner as the executing active thread of Step 1001.

However, if at Step 1012, it is determined that the executing thread is a non-preemptive thread. Still the thread type of the next thread is determined (Step 1031). If the next thread is determined to be a start-over thread, the executing thread continues operation until the occurrence of a thread terminating event (Step 1033). Typically, such thread terminating events occur when the executing thread completes execution of its instructions or when the executing thread executes a reschedule call. Upon the occurrence of a thread terminating event, the process will be executed as in Steps 1015–1019 (see Step 1035). However, if it is determined that the next thread is a partial thread (Step 1031), then a different course of action is followed. The executing thread continues execution of its instructions in the execution unit until the occurrence of a thread termination event (Step 1037). Upon the occurrence of the thread terminating event, Step 1039 is executed. This is to say that Steps 1021–1022 are executed.

Although only a few embodiments of the present invention have been described, it should be understood that the present invention may be embodied in many other specific forms without departing from the spirit or the scope of the present invention. By way of example, partial threads and start-over threads may be implemented in threads having their preemption settings enabled or disabled. Moreover, although embodiments of the invention are best implemented with respect to an embedded microprocessor system, it should be appreciated that the present invention may generally be implemented on any suitable computer device. Specifically, the methods implementing partial and start-over threads in accordance with the present invention may generally be implemented in any threaded or multi-threaded system without departing from the spirit or the scope of the present invention. Therefore, the present examples are to be considered as illustrative and not restrictive, and the invention is not to be limited to the details given herein, but may be modified within the scope of the appended claims along with their full scope of equivalents.

What is claimed is:

1. A computing system having at least one CPU, registers for executing threads, and memory, and means for executing a start-over thread comprising:
    (a) means for using the registers to execute a first thread;
    (b) means for initiating an interrupt event that signals the activation of a staff-over thread, the start-over thread requiring the use of a known quantity of registers during execution, the start-over thread being executed using only a portion of the registers, being reserved for tasks that occur frequently and are short in duration, and being a non-preemptive thread;
    (c) means for saving a first portion of information in the registers to a memory location, the first portion including information associated with the first threads wherein information from only a number of registers equal to the known quantity of registers to be used by the start-over thread is saved and wherein a second portion of information in the registers is unsaved,
    (d) means for using the registers to execute the start-over thread; and
    (e) means for, upon completion of the start-over thread, restoring from memory the first portion of information from the registers.

2. The system of claim 1 wherein the means for executing a first thread is a preemptive thread and wherein immediately after the means for initiating an interrupt event executes, the first thread ceases operation.

3. The system of claim 2 wherein the means for saving a first portion of information in the registers to a memory location includes means for saving the first portion to an undesignated memory ,location.

4. The system of claim 1, further comprising means for conducting further computing system operations including means for resuming execution of the first Thread.

5. The system of claim 1 wherein the means for executing a first thread is a non-preemptive thread such that after execution of the means for initiating an interrupt event, the first thread continues to execute using the registers until a thread termination event occurs.

6. The system of claim 5 wherein the means for saving a first portion of registers to a memory location includes means for saving the first portion to an undesignated memory location.

7. The system of claim 6 wherein the thread termination event comprises completion of the executing first thread.

8. The system of claim 7 wherein the means for executing using the registers, the start-over thread further includes means for scheduling for execution a ready thread having the current highest priority, wherein the ready thread having the current highest priority is the start-over thread.

9. The system of claim 6 wherein the thread termination event comprises executing a reschedule call by the executing first thread.

10. The system of claim 9 wherein, in response to the reschedule call, the means for executing using the registers includes means for scheduling for execution a ready thread having the current highest priority wherein the ready thread having the current highest priority is the start-over thread.

11. The system of claim 10 further comprising means for conducting further computing system operations including, after execution of the start-over thread, resuming execution of the first thread.

12. The system of claim 1 further comprising means for conducting further computing system operations including, after execution of the start-over thread, resuming execution of the first thread.

13. In a computing system operating in a multi-threaded computing environment including at least one CPU, a plurality of registers in an execution unit, and memory, a method for operating a stan-over thread comprising the acts of:
- (a) executing a first thread using the registers;
- (b) initiating an interrupt event;
- (c) determining a next thread to be activated;
- (d) determining the preemption status of the first thread;
- (e) identifying the next thread as a start-over thread which requires a predetermined number of registers to execute its function in the computing system, the stan-over thread being executed using on a portion of the registers, being reserved for tasks that occur frequently and are short in duration, and being a non-preemptive thread;
- (f) associated with the first thread, conducting an abbreviated context saving of a first portion of the registers such that the first portion includes only a number of registers equal to the predetermined number of registers required by the start-over thread, and not saving a second portion of the registers, the first portion of registers being saved to any available storage location in memory;
- (g) executing the start-over thread using the predetermined number of registers required by the start-over thread;
- (h) upon completion of the start-over thread, restoring the first portion of registers saved to the registers of the execution unit; and
- (i) conducting further computing system operations.

14. The method of claim 13 wherein the act (c) of determining the next thread to be activated includes the further act of defining the next thread as a current highest priority ready thread.

15. The method of claim 13 wherein the act (d) of determining the preemption status of the first thread includes determining that the first thread is a preemptive thread and whereupon, immediately upon the initiation of the initiating interrupt event the first thread ceases execution and wherein the acts of (e)–(i) commence immediately upon the initiation of the initiating interrupt event.

16. The method of claim 13 wherein the act (i) of conducting further computing system operations includes resuming execution of the first thread.

17. A computing device implementing the method of claim 13.

* * * * *